United States Patent
Aso et al.

(10) Patent No.: US 8,272,286 B2
(45) Date of Patent: Sep. 25, 2012

(54) LINEAR ACTUATOR WITH DUSTPROOF MECHANISM

(75) Inventors: Toshiyuki Aso, Tokyo (JP); Toshiya Tanaka, Tokyo (JP); Norinobu Ogawa, Azumino (JP); Toshiaki Mizuno, Azumino (JP); Minoru Tsukada, Azumino (JP); Yukitoshi Kobayashi, Azumino (JP)

(73) Assignee: THK Co., Ltd., Tokyo (JP)

( * ) Notice: Subject to any disclaimer, the term of this patent is extended or adjusted under 35 U.S.C. 154(b) by 308 days.

(21) Appl. No.: 12/676,474

(22) PCT Filed: Aug. 12, 2008

(86) PCT No.: PCT/JP2008/064449
§ 371 (c)(1),
(2), (4) Date: Mar. 4, 2010

(87) PCT Pub. No.: WO2009/034804
PCT Pub. Date: Mar. 19, 2009

(65) Prior Publication Data
US 2010/0206102 A1    Aug. 19, 2010

(30) Foreign Application Priority Data
Sep. 13, 2007 (JP) .................................. 2007-237768

(51) Int. Cl.
*F16H 3/06* (2006.01)
*F16H 27/02* (2006.01)
*F16H 29/02* (2006.01)
*F16H 29/20* (2006.01)

(52) U.S. Cl. .................... 74/89.4; 74/89.41; 277/650

(58) Field of Classification Search .................. 74/89.23, 74/89.32, 89.33, 89.4, 89.41; 277/628, 630, 277/631, 634, 637, 640, 650, 652
See application file for complete search history.

(56) References Cited

U.S. PATENT DOCUMENTS

| | | | | |
|---|---|---|---|---|
| 5,380,246 A | * | 1/1995 | Katahira | 454/64 |
| 5,590,580 A | * | 1/1997 | Nagai | 92/33 |
| 6,000,292 A | | 12/1999 | Nagai et al. | |

(Continued)

FOREIGN PATENT DOCUMENTS

| | | |
|---|---|---|
| JP | 63-172545 | 11/1988 |
| JP | 2-145235 | 6/1990 |
| JP | 8-290384 | 11/1996 |

(Continued)

OTHER PUBLICATIONS

International Search Report, PCT/JP2008/064449, Sep. 16, 2008.

*Primary Examiner* — Justin Krause
(74) *Attorney, Agent, or Firm* — Young & Thompson

(57) ABSTRACT

A linear actuator with a dustproof mechanism provides reliable dustproof capability over the entire stroke of the actuator. A linear actuator 100 with a dustproof mechanism includes a ball screw, a movable stage 4 including a ball screw nut that engages the ball screw, the movable stage capable of making linear reciprocating motion in the axial direction of the ball screw in response to rotary motion of the ball screw, a housing member 2 disposed to cover at least the ball screw, openings 27, 28 formed in the housing member 2 along the path along which the movable stage 4 travels, and dustproof belts 29, 30 disposed inside the housing member 2 to block the openings 27, 28. The linear actuator 100 with a dustproof mechanism further includes end plate covers 105a, 105b that cover both ends of the housing member 2 and hence has high dustproof performance.

13 Claims, 10 Drawing Sheets

U.S. PATENT DOCUMENTS

| | | | |
|---|---|---|---|
| 6,460,859 B1 * | 10/2002 | Hammi et al. | 277/596 |
| 6,571,932 B1 | 6/2003 | Kawashima et al. | |
| 7,562,595 B2 * | 7/2009 | Kato | 74/89.4 |
| 2002/0047243 A1 | 4/2002 | Kato et al. | |
| 2003/0005785 A1 * | 1/2003 | Ung et al. | 74/89.4 |
| 2003/0121759 A1 | 7/2003 | Kawashima et al. | |

FOREIGN PATENT DOCUMENTS

| | | |
|---|---|---|
| JP | 9-201002 | 7/1997 |
| JP | 2000-266151 | 9/2000 |
| JP | 2002-206530 | 7/2002 |
| JP | 2005-188600 | 7/2005 |

* cited by examiner (a)

LINEAR ACTUATOR WITH DUSTPROOF MECHANISM

TECHNICAL FIELD

The present invention relates to a linear actuator with a dustproof mechanism, for example, a linear actuator with a dustproof mechanism suitably used in a clean room as a drive mechanism.

BACKGROUND ART

The applicant and associated companies thereof have proposed a variety of actuators with a dustproof mechanism (including motion guidance apparatus that guide the motion of a traveling object) disclosed, for example, in the following Patent Documents 1 and 2. For example, the linear actuator with a dustproof mechanism proposed in Patent Document 1 is characterized by a function of reliably preventing dust from leaking through an opening of an actuator housing and a device provided on a movable stage and allowing a dustproof belt to detour in order to prevent the dustproof belt from interfering with a portion protruding from the movable stage in the opening of the actuator housing.

The linear actuator with a dustproof mechanism disclosed in the Patent Document 1 will be described with reference to FIG. 10. FIG. 10 describes the configuration of the linear actuator with a dustproof mechanism according to the related art, (a) in FIG. 10 being a top view of the linear actuator with a dustproof mechanism, (b) in FIG. 10 being a front view of the linear actuator with a dustproof mechanism, and (c) in FIG. 10 being a transverse cross-sectional view of the linear actuator with a dustproof mechanism.

As shown in FIG. 10, the linear actuator 1 with a dustproof mechanism according to the related art includes an elongated box-shaped housing member 2, a ball screw 3 rotatably supported in the housing member 2, a movable stage 4 that makes linear reciprocating motion in response to rotary motion of the ball screw 3, and a drive motor 5 for rotating the ball screw 3.

The housing member 2 includes a horizontal substrate 21, a pair of right and left vertical side plates 22, 23 standing vertically from the upper surface of the horizontal substrate and extending in parallel to the ball screw 3, and end blocks 24, 25 respectively attached to the front and rear ends of the vertical side plates 22, 23. One of the end blocks, the end block 24, rotatably supports one end of the ball screw 3. The other one of the end blocks, the end block 25, rotatably supports the other end of the ball screw 3, which passes through the block 25 and is connected to the drive motor 5.

Upper end portions of the right and left vertical side plates 22, 23 are bent inward at a right angle and form right and left horizontal upper plate portions 22a, 23a. A central partition plate 26 is disposed in between the right and left horizontal upper plate portions 22a, 23a, and the front and rear ends of the central partition plate 26 are fixed to the end blocks 24, 25, respectively. As a result, a left opening 27 extending in the axial direction of the ball screw 3, that is, the direction in which the movable stage 4 travels, is formed between the horizontal upper plate portion 22a and the central partition plate 26. Similarly, a right opening 28 is formed between the horizontal upper plate portion 23a and the central partition plate 26.

The openings 27, 28 are blocked with dustproof belts 29, 30, each being wider than the corresponding opening. The dustproof belts 29, 30 extend between the end blocks 24, 25 along the lower side of the horizontal upper plate portions 22a, 23a and the central partition plate 26.

As described above, the housing member 2 forms a box-shaped compartment surrounded by the horizontal substrate 21, the vertical side plates 22, 23 (horizontal upper plate portions 22a, 23a), the central partition plate 26, the end blocks 24, 25, and the dustproof belts 29, 30 that block the openings 27, 28. The housing member 2 thus covers the ball screw 3 and hence serves to keep dust produced from the actuator in the compartment.

The movable stage 4 includes a nut block 41 having a ball screw nut that engages the ball screw 3 formed therein, a lower plate 42 fixed to the upper surface of the nut block 41, an intermediate plate 43 fixed to the upper surface of the lower plate 42, and an upper plate 44 fixed to the upper surface of the intermediate plate 43. The side surfaces of the nut block 41 are supported by a linear guide rail 31 attached in the housing member 2 so that the nut block 41 can slide along the axial line of the ball screw 3.

The movable stage 4 is configured in such a way that the upper plate 44 is located outside the housing member 2 and the intermediate plate 43, the lower plate 42, and the nut block 41 are located inside the housing member 2. That is, the upper plate 44 protrudes out of the housing member 2 through the openings 27, 28, and, when connected to an object to be guided, can transmit a moving force to the object to be guided.

As the detouring device that allows the dustproof belts 29, to detour, rotatable rollers 61 to 66 are provided on the movable stage 4. The rollers 61 to 66 horizontally protrude from the portions of the right and left side surfaces of the movable stage 4 that are located in the housing member 2 and are disposed in such a way that the positions of the central rollers 63, 64 are lower than those of the other rollers 61, 62, 65, and 66, which are located on both end sides in the axial direction. (The roller 65 is disposed in a position opposite the position where the roller 66 is disposed, but is not shown in FIG. 10. The roller 65 is therefore presented in brackets in the following description.)

The dustproof belts 29, 30 engage the rollers 61 to 66 in such a way that the upper plate 44 protruding out of the housing member 2 through the openings 27, 28 does not interfere with the dustproof belts 29, 30. That is, the dustproof belts 29, 30 engage the rollers 61 to 66 in such a way that the dustproof belts 29, 30 run below the protruding portion of the upper plate 44 and detour the protruding portion. Specifically, the left dustproof belt 29 (the upper one in the plane of (a) of FIG. 10) engages the upper side of the front roller 61, the lower side of the central roller 63, and the upper side of the rear roller (65). Similarly, the right dustproof belt 30 (the lower one in the plane of (a) of FIG. 10) engages the upper side of the front roller 62, the lower side of the central roller 63, and the upper side of the rear roller 66.

Since the linear actuator 1 with a dustproof mechanism according to the related art is configured as described above, the openings 27, 28 formed along the path along which the movable stage 4 travels can be always blocked with the dustproof belts 29, 30. Dust produced, for example, when the ball screw nut in the nut block 41 slides along the ball screw 3 or when the nut block 41 slides along the linear guide rail will not leak out of the housing member 2 through the openings 27, 28 thereof.

Further in the linear actuator 1 with a dustproof mechanism according to the related art, since the dustproof belts 29, 30 are disposed inside the housing member 2 and the dustproof belts 29, 30 can run below the movable stage 4, which travels along the openings 27, 28, and detour the movable stage 4, the openings 27, 28 always remain blocked with the dustproof belts 29, 30 when the movable stage 4 travels.

The thus configured linear actuator 1 with a dustproof mechanism according to the related art further includes air inlets through which air is sucked out of the housing member 2. That is, housing air inlets 22b, 23b are formed in the pair of right and left vertical side plates 22, 23, as shown in FIG. 10, and the air in the housing member 2 can be sucked through the housing air inlets 22b, 23b.

Further, air inlet ducts 7, 8 are attached to the horizontal upper plate portions 22a, 23a, which are formed at the upper ends of the vertical side plates 22, 23, and air inlets 7b, 8b for the narrow ducts extending along the openings 27, 28 are formed between the air inlet ducts 7, 8 and the horizontal upper plate portions 22a, 23a. The dust produced in the housing is therefore sucked through the housing air inlets 22b, 23b formed in the right and left vertical side plates 22, 23 to an external duct collector or any other suitable component (not shown) and removed out of the housing member 2.

In a clean room or any other similar space, an air flow traveling downward is typically formed. Therefore, when air is sucked through the air inlets 7b, 8b for the ducts disposed adjacent to the openings 27, 28, the dust having leaked through the openings 27, 28 is sucked through the air inlets 7b, 8b for the ducts along with the air traveling downward. The dust can therefore be reliably sucked and removed without being scattered into the atmosphere.

Patent Document 1: Japanese Patent Laid-Open No. 2000-266151

Patent Document 2: Japanese Patent Laid-Open No. 2005-188600

DISCLOSURE OF THE INVENTION

Problems to be Solved by the Invention

The linear actuator with a dustproof mechanism according to Patent Document 1 can show appropriate dustproof capability when used under typical conditions, but the dustproof capability disadvantageously lowers when fast motion is required.

That is, when linear actuator guiding motion occurs at high speeds, the high-speed motion of the movable stage causes the pressure in the actuator housing to rapidly increase, and the dust disadvantageously tends to leak particularly through both ends of the actuator housing.

The present invention has been made in view of the case described above. An object of the present invention is to provide a linear actuator with a dustproof mechanism capable of showing reliable dustproof capability over the entire stroke of the actuator even when the actuator is operated at high speeds.

Means for Solving the Problems

A linear actuator with a dustproof mechanism according to the present invention comprises a ball screw; a movable stage including a ball screw nut that engages the ball screw, the movable stage capable of making linear reciprocating motion in the axial direction of the ball screw in response to rotary motion of the ball screw; a housing member disposed to cover at least the ball screw; an opening formed in the housing member along the path along which the movable stage travels; and a dustproof belt disposed inside the housing member to block the opening. The movable stage includes a detouring device that allows the portion of the dustproof belt that overlaps with the movable stage to detour in order to move the movable stage along the opening with the opening remaining blocked with the dustproof belt. The linear actuator with a dustproof mechanism is characterized in that end plate covers are provided to cover the ends of the housing member.

In the linear actuator with a dustproof mechanism according to the present invention, each of the end plate covers preferably includes an elastic member at the location where the end plate cover comes into contact with the housing member.

In the linear actuator with a dustproof mechanism according to the present invention, each of the end plate covers can be shaped to cover greater areas of the housing member in the vicinity where the dustproof belt is disposed than the other areas of the housing member.

In the linear actuator with a dustproof mechanism according to the present invention, it is preferred that each of the end plate covers includes a flange and the flange is disposed in a position facing the location where the dustproof belt is disposed in the housing member.

Another linear actuator with a dustproof mechanism according to the prevent invention comprises: a ball screw; a movable stage including a ball screw nut that engages the ball screw, the movable stage capable of making linear reciprocating motion in the axial direction of the ball screw in response to rotary motion of the ball screw; a housing member disposed to cover at least the ball screw; an opening formed in the housing member along the path along which the movable stage travels; and a dustproof belt disposed inside the housing member to block the opening. The movable stage includes a detouring device that allows the portion of the dustproof belt that overlaps with the movable stage to detour in order to move the movable stage along the opening with the opening remaining blocked with the dustproof belt. The linear actuator with a dustproof mechanism is characterized in that a dust collection device that confines dust in the housing member is provided at an end of the housing member.

In the linear actuator with a dustproof mechanism according to the present invention, the dust collection device can include a dust collection compartment formed in an airtight manner at an end of the housing member, a communication hole that allows the interior of the dust collection compartment to communicate with the interior of the housing member, and a sucking port through which dust in the dust collection compartment is discharged.

In the linear actuator with a dustproof mechanism according to the present invention, an exhaust device can be formed at the communication hole.

In the linear actuator with a dustproof mechanism according to the present invention, the exhaust device is preferably a fan.

In the linear actuator with a dustproof mechanism according to the present invention, the dustproof belt has attachment holes for fixing the dustproof belt to the housing member, and the attachment holes can be formed of at least two pairs of attachment holes, four in total, on both ends of the dustproof belt and formed in the periphery of the dustproof belt.

In the linear actuator with a dustproof mechanism according to the present invention, the detouring device provided on the movable stage includes a plurality of rotatable rollers that engage the dustproof belt, and at least the surface of each of the plurality of rollers can be made a resin material.

EFFECTS OF THE INVENTION

The present invention provides a linear actuator with a dustproof mechanism capable of showing reliable dustproof capability over the entire stroke of the actuator, for example, even when the actuator is operated at high speeds.

REFERENCE NUMERALS

Figure 1:
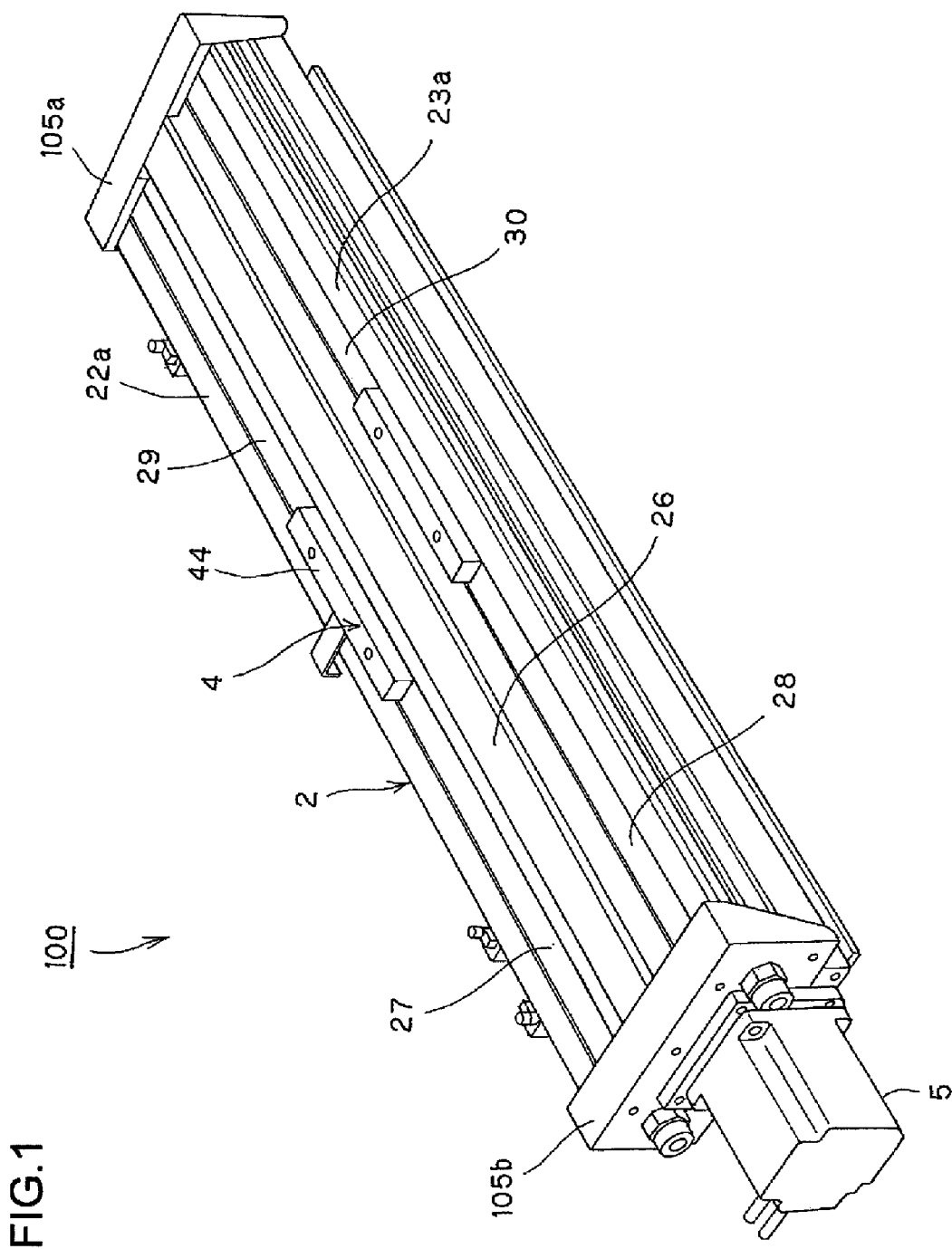
FIG. 1 is an exterior perspective view of a linear actuator with a dustproof mechanism according to a first embodiment.

1 linear actuator with a dustproof mechanism according to related art, 2 housing member, 3 ball screw, 4 movable stage, 5 drive motor, 7,8 air inlet duct, 7b, 8b air inlet for duct, 21 horizontal substrate, 22, 23 vertical side plate, 22a, 23a horizontal upper plate portion, 22b, 23b housing air inlet, 24, end block, 26 central partition plate, 27, 28 opening, 29, dustproof belt, 31 linear guide rail, 41 nut block, 42 lower plate, 43 intermediate plate, 44 upper plate, 50 dust collection compartment, 51 communication hole, 52 air inlet, 53 fan (exhaust device), 61, 62, 63, 64, (65), 66 roller, 100 linear actuator with a dustproof mechanism according to first embodiment, 105a, 105b end plate cover, 106a, 106b end-side plate, 107a, 107b upper-side plate, 108a, 108b, 109a, 109b side surface plate, 110a, 110b drooping plate, 111a, 111b elastic member, 120 attachment hole (according to related art), 121 attachment hole (according to present invention), 200 linear actuator with a dustproof mechanism according to second embodiment.

MODE FOR CARRYING OUT THE INVENTION

Preferred embodiments for implementing the present invention will be described below with reference to the drawings. It is noted that the following embodiments do not limit the invention set forth in the claims and all combinations of the features described in the embodiments are not necessarily essential for "MEANS FOR SOLVING THE PROBLEMS." Further, in the description of the following embodiments, the members that are the same as or similar to those described in "BACKGROUND ART" have the same reference characters, and no description thereof will be made.

[First Embodiment]

Figure 2:
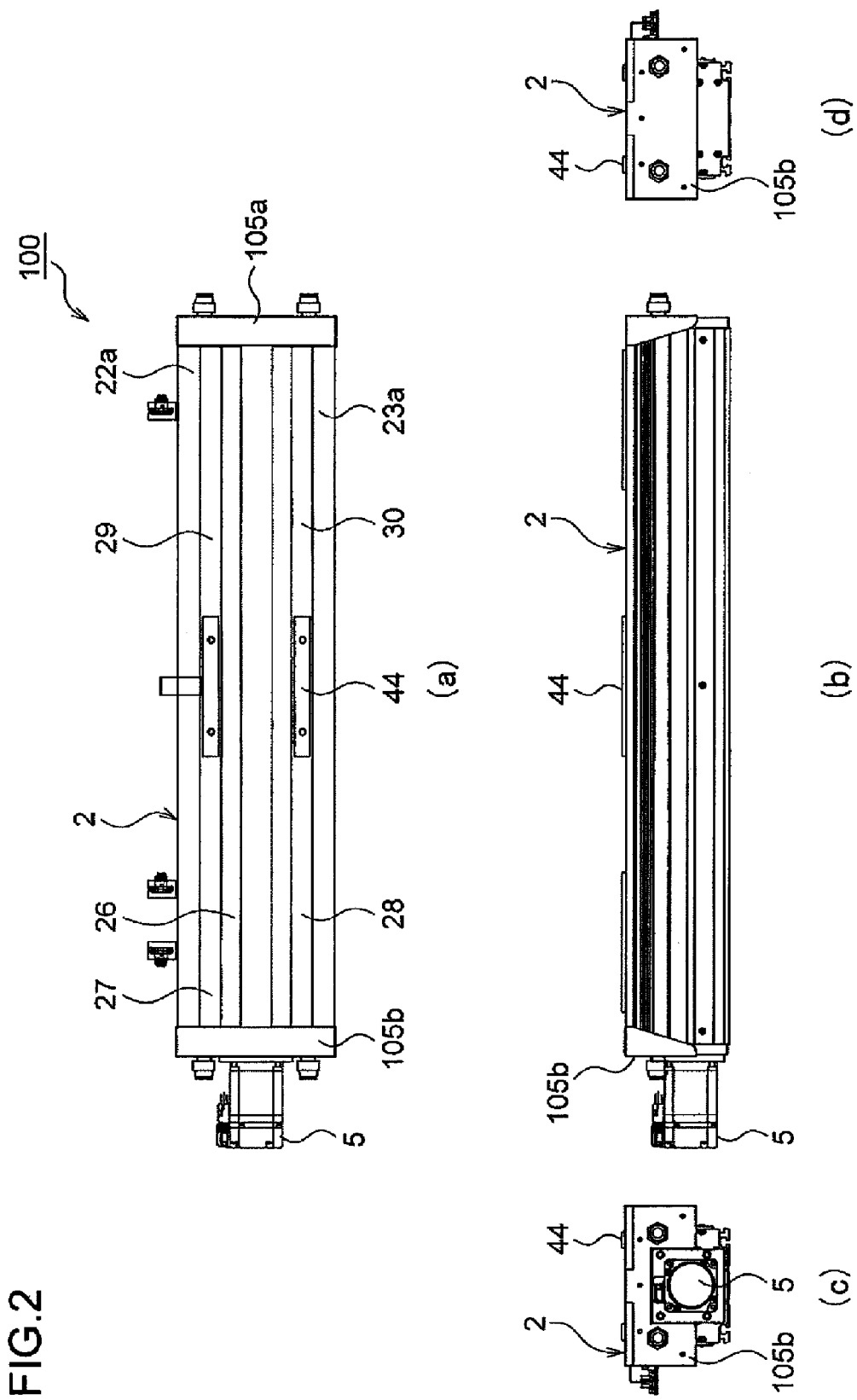
FIG. 2 describes the exterior configuration of the linear actuator with a dustproof mechanism according to the first embodiment, (a) in FIG. 2 being a top view, (b) in FIG. 2 being a front view, (c) in FIG. 2 being a side view showing the side where a motor is present, and (d) in FIG. 2 being a side view showing the side that is opposite the side where the motor is present.
Figure 3:
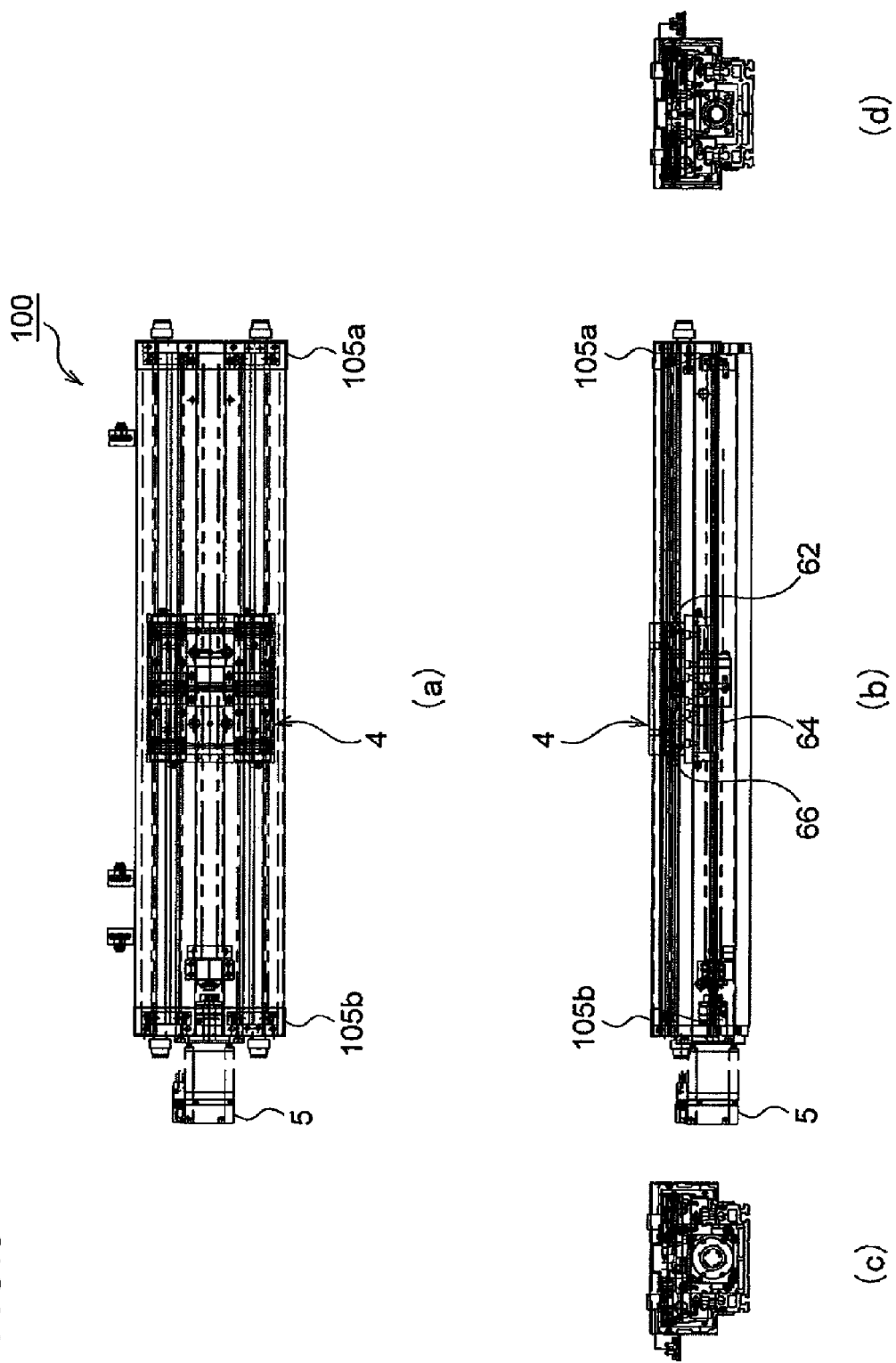
FIG. 3 is a see-through view describing the inner configuration of the linear actuator with a dustproof mechanism according to the first embodiment, (a) in FIG. 3 being a top view, (b) in FIG. 3 being a front view, (c) in FIG. 3 being a side view showing the side where the motor is present, and (d) in FIG. 3 being a side view showing the side that is opposite the side where the motor is present.
Figure 4:
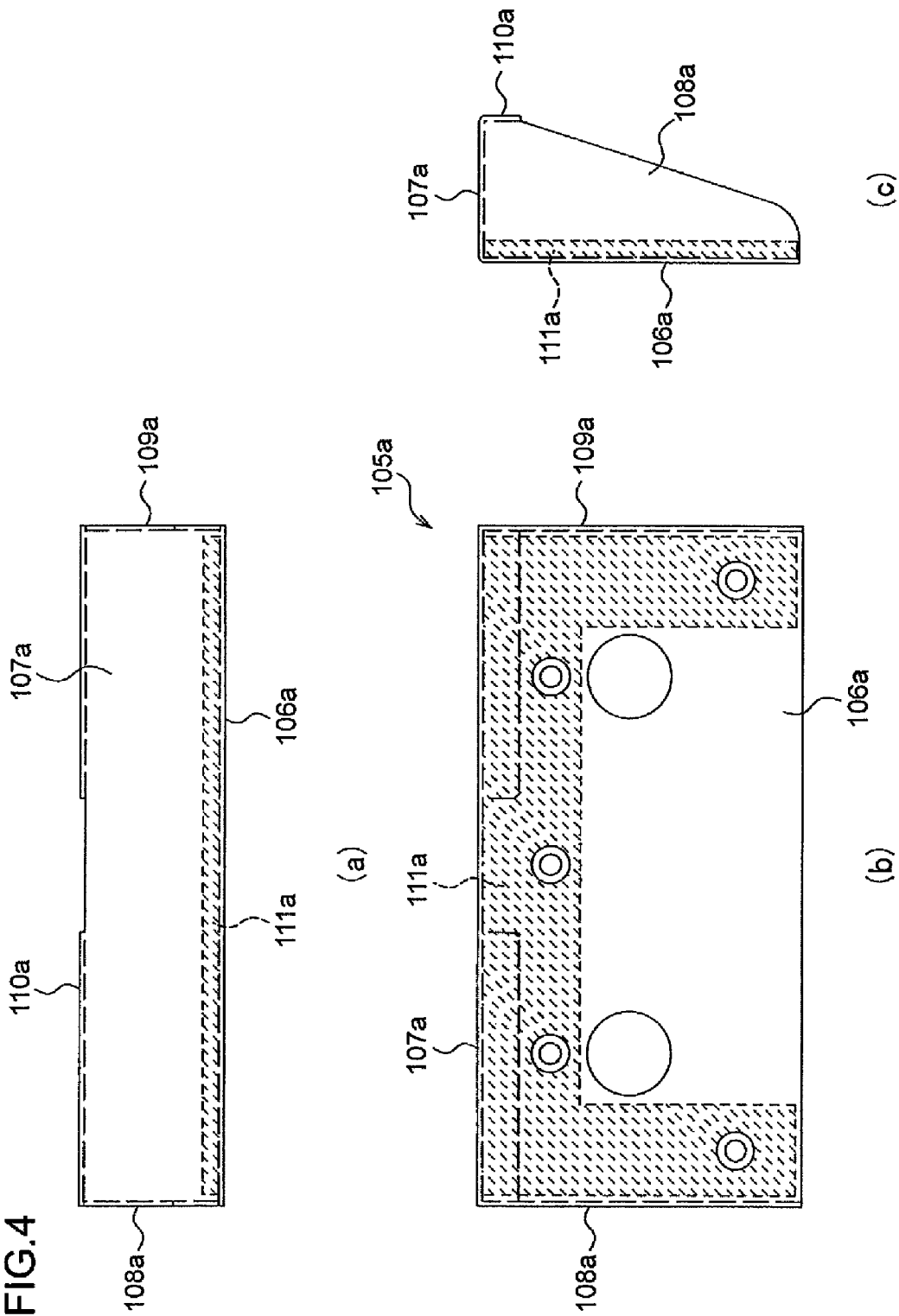
FIG. 4 shows an end plate cover disposed on the side that is opposite the side where the motor is present, (a), (b), and (c) in FIG. 4 showing the top, the front, and a side of the end plate cover.
Figure 5:
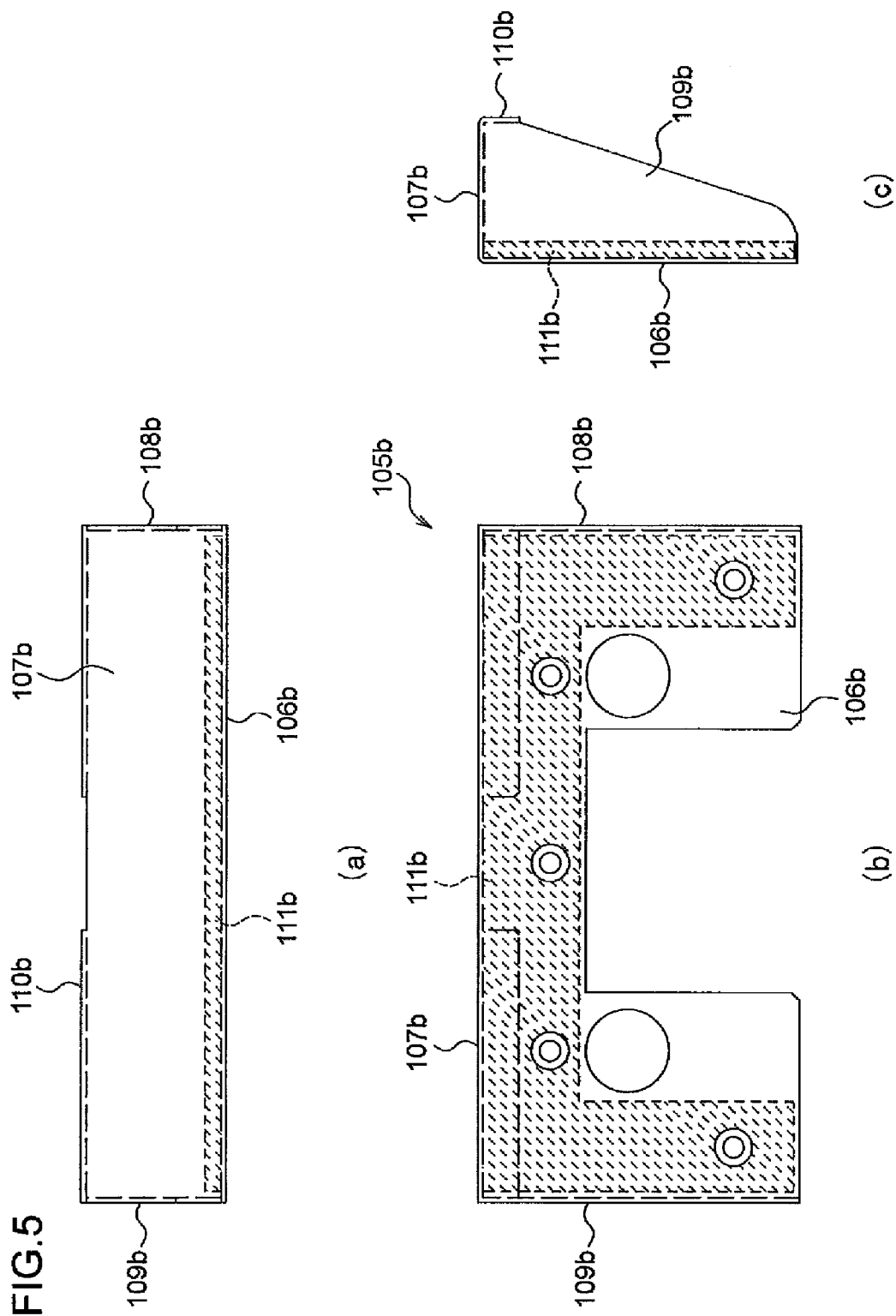
FIG. 5 shows an end plate cover disposed on the side where the motor is present, (a), (b), and (c) in FIG. 5 showing the top, the front, and a side of the end plate cover.
Figure 6:
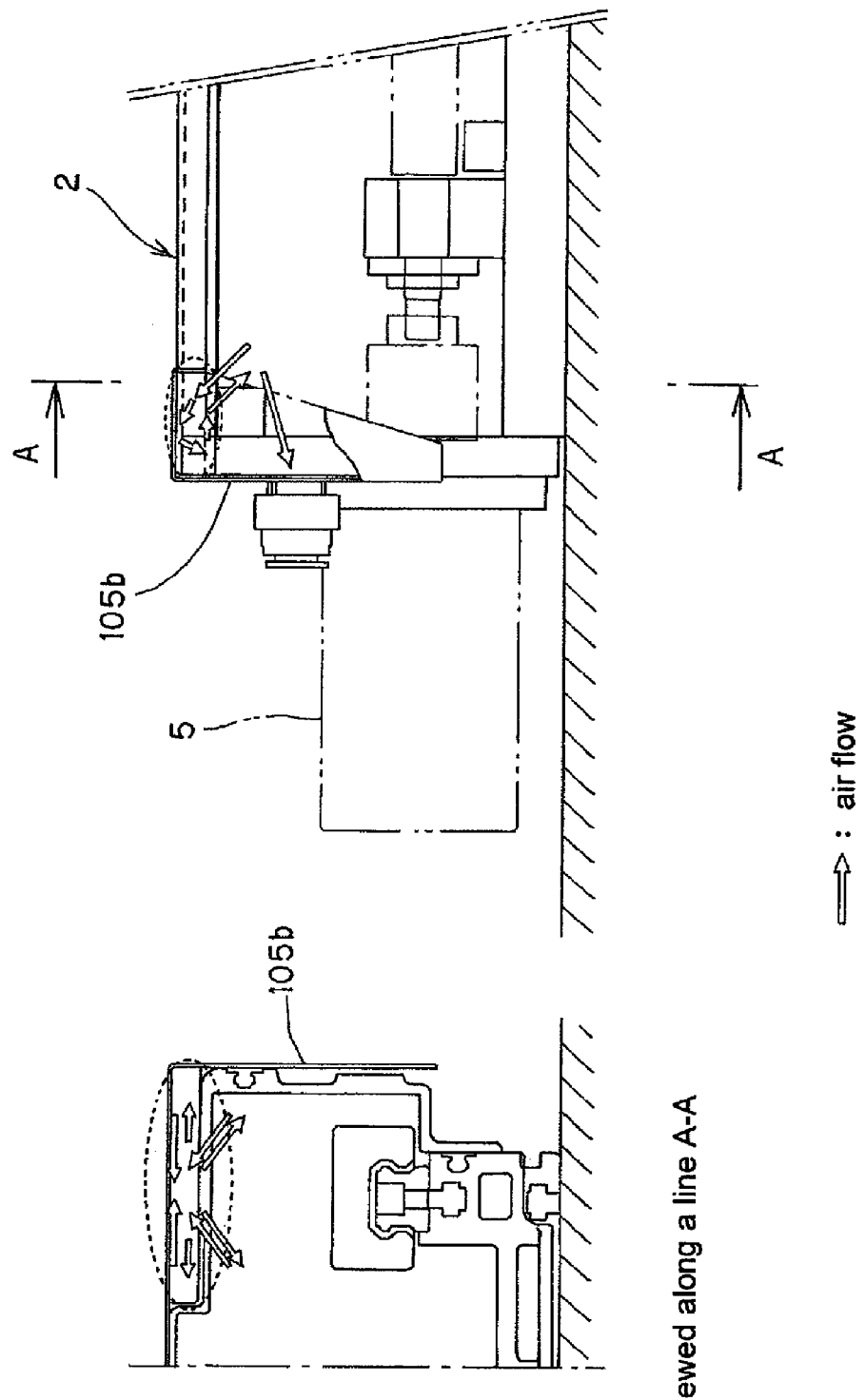
FIG. 6 describes how the end plate covers according to the first embodiment work.

A linear actuator 100 with a dustproof mechanism according to a first embodiment will be described with reference to FIGS. 1 to 6. FIG. 1 is an exterior perspective view of the linear actuator 100 with a dustproof mechanism according to the first embodiment. FIG. 2 describes the exterior configuration of the linear actuator 100 with a dustproof mechanism according to the first embodiment, (a) in FIG. 2 being a top view, (b) in FIG. 2 being a front view, (c) in FIG. 2 being a side view showing the side where a motor is present, and (d) in FIG. 2 being a side view showing the side that is opposite the side where the motor is present. FIG. 3 is a see-through view describing the inner configuration of the linear actuator 100 with a dustproof mechanism according to the first embodiment, (a) in FIG. 3 being a top view, (b) in FIG. 3 being a front view, (c) in FIG. 3 being a side view showing the side where the motor is present, and (d) in FIG. 3 being a side view showing the side that is opposite the side where the motor is present. FIG. 4 shows an end plate cover 105a disposed on the side that is opposite the side where the motor is present, and FIG. 5 shows an end plate cover 105b disposed on the side where the motor is present. In FIGS. 4 and 5, (a), (b), and (c) show the top, the front, and sides of the end plate covers. FIG. 6 describes how the end plate covers 105a, 105b according to the first embodiment work.

The linear actuator 100 with a dustproof mechanism according to the first embodiment has a configuration substantially the same as that of the linear actuator 1 with a dustproof mechanism according to the related art described above, but includes the end plate covers 105a, 105b capable of covering both ends of the housing member 2, as shown in FIGS. 1 to 3, in order to further improve the dustproof capability.

The end plate covers 105a, 105b are described below in detail with reference to FIGS. 4 and 5. The end plate covers 105a, 105b are members formed to overlap with parts of the end, upper, and side surfaces of the housing member 2 and configured to cover the vicinity of respective upper end portions of the housing member 2. That is, the end plate covers 105a, 105b are members characterized in that they are shaped to cover greater areas of the end portions of the housing member 2 in the vicinity where the dustproof belts 29, are disposed than the other areas of the housing member 2.

The shape is more specifically described with reference to the end plate cover 105a, which is disposed on the side that is opposite the side where the motor is present. As shown in FIG. 4, the end plate cover 105a is formed of an end-side plate 106a having a substantially rectangular shape that covers part of the corresponding end surface of the housing member 2, an upper-side plate 107a having a substantially rectangular shape that covers part of the upper surface of the housing member 2, and a pair of side surface plates 108a, 109a, each having a substantially triangular shape that is connected to the end-side plate 106 and the upper-side plate 107a and covers part of the corresponding side surface of the housing member 2. The side surface plates 108a, 109a are formed in such a way that two sides that form a right angle of the substantially right triangular shape are connected to the end-side plate 106a and the upper-side plate 107a and the oblique side facing the right angle faces downward to the center of the housing member 2. That is, the end plate cover 105a employs a structure having a flange formed of the upper-side plate 107a and the pair of side surface plates 108a, 109a.

Further, a drooping plate 110a extending downward is formed at the tip of the upper-side plate 107a, that is, at the portion of the upper-side plate 107a that is opposite the portion connected to the end-side plate 106a. The drooping plate 110a is a member provided to improve the dustproof performance on the upper side of the housing member 2 where the sealing performance is difficult to improve because the external shape of the upper side is more complicated than those of the other portions of the housing member 2. The presence of the drooping plate 110a forms a gap between the upper surface of the housing member 2 and the upper-side plate 107a of the end plate cover 105a, that is, in the position of the flange of the end plate cover 105a.

The gap is formed as a space totally surrounded by the upper surface of the housing member 2, the upper-side plate 107a of the end plate cover 105a, the end-side plate 106a, the pair of side surface plates 108a, 109a, and the drooping plate 110a. Since the position where the gap is formed, that is, the position where the flange is provided, faces the location where the dustproof belts 29, 30 are disposed, the position where the gap is formed overlaps with a position where dust most likely leaks when the movable stage 4 travels at high speeds and hence the pressure in the housing member 2 increases. Even when dust leaks out of the housing member 2, the dust environment outside the housing member 2 will not immediately be worsened because the dust stays in the gap and does not directly leak outward. Further, the inventors have conducted investigation and research and found that most of the dust that stays in the gap will remain in the gap or is sucked again into the housing member 2, and it is apparent that the presence of the gap greatly contributes to improvement in dustproof performance (see FIG. 6).

Further, the end plate cover 105a has an elastic member 111a at the location where the end plate cover 105a comes into contact with the housing member 2, whereby the housing member 2 comes into more intimate contact with the end plate cover 105a. The elastic member 111a according to the present embodiment shown in FIG. 4 is made of a special polyurethane foam called MOLTOPREN, or can alternatively be made of any known material having elasticity, such as rubber and sponge. Attaching the elastic member 111a to the end plate cover 105a further improves the dustproof performance of the linear actuator 100 with a dustproof mechanism.

The end plate cover 105b disposed on the side where the motor is present shown in FIG. 5 has a structure substantially the same as that of the end plate cover 105a disposed on the side that is opposite the side where the motor is present described above, but differs in that an end-side plate 106b has a substantially inverted U-like shape obtained by cutting a substantially rectangular plate in order not to interfere with the motor 5.

[Second Embodiment]

The above first embodiment has been described with reference to the linear actuator 100 with a dustproof mechanism including the end plate covers that cover both ends of the housing member so that dust will not scatter around. A second embodiment will be described below with reference to a linear actuator with a dustproof mechanism that employs a structure for further enhancing the dustproof capability.

Figure 7:
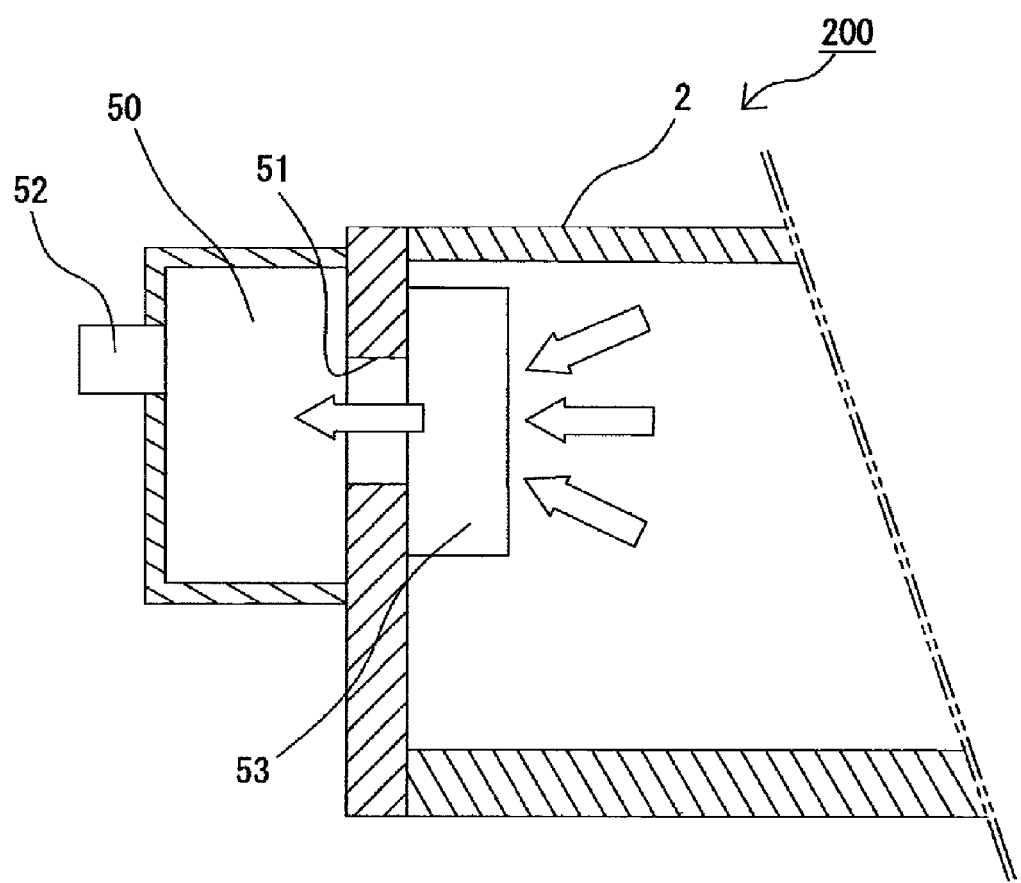
FIG. 7 describes the configuration and operation of a linear actuator with a dustproof mechanism according to a second embodiment.

FIG. 7 describes the configuration and operation of the linear actuator with a dustproof mechanism according to the second embodiment. As shown in FIG. 7, a linear actuator 200 with a dustproof mechanism according to the second embodiment is characterized in that a dust collection compartment 50 is formed in an airtight manner at an end of the housing member 2 and the interior of the dust collection compartment 50 communicates with the interior of the housing member 2 through a communication hole 51 and an air exhaust device 53. The dust collection compartment 50 is characterized in that it has an air inlet 52 through which dust in the dust collection compartment 50 can be discharged therefrom.

The dust collection compartment 50 is formed of a box-shaped member and attached to an end of the housing member 2 in an airtight manner. The interior of the dust collection compartment 50 communicates with the interior of the housing member 2 through the communication hole 51, whereby the dust in the housing member 2 will not leak through the other portions of the surface to which the dust collection compartment 50 is attached.

The air exhaust device 53 is formed of a fan and capable of guiding the dust in the housing member 2 into the dust collection compartment 50 along with the air in the housing member 2 and confining the dust and the air in the dust collection compartment 50 all the times. The air exhaust device 53 can alternatively be formed of, for example, a non-return valve that opens and closes in accordance with the change in pressure in the housing member 2.

Air is sucked out of the dust collection compartment 50 through the air inlet 52 of the dust collection compartment 50. The dust collected in the dust collection compartment 50 can therefore be discharged out of the clean room along with the air through the air inlet 52 so that no dust scatters around.

As described above, when linear actuator guiding motion occurs at high speeds, the high-speed motion of the movable stage causes the pressure in the actuator housing to rapidly increase, and dust disadvantageously tends to leak particularly through both ends of the actuator housing. Therefore in the second embodiment, the dust collection compartment 50 is formed at an end of the actuator housing, through which dust tends to leak. The amount of air sucked through the air inlet 52 is always fixed, and when the pressure in the housing member 2 rapidly increases, air can be temporarily collected and confined in the dust collection compartment 50 and then the air in the dust collection compartment 50 can be sucked. In this way, the amount of sucked air can be fixed, and the dust left in the housing member 2 will not leak out of the actuator housing through any gap thereof.

The preferred embodiments of the present invention have been described above, but the technical scope of the present invention is not limited to the scope described in the above embodiments. A variety of changes or improvements can be made to the embodiments described above.

[Improvement of Dustproof Belts]

Figure 8:
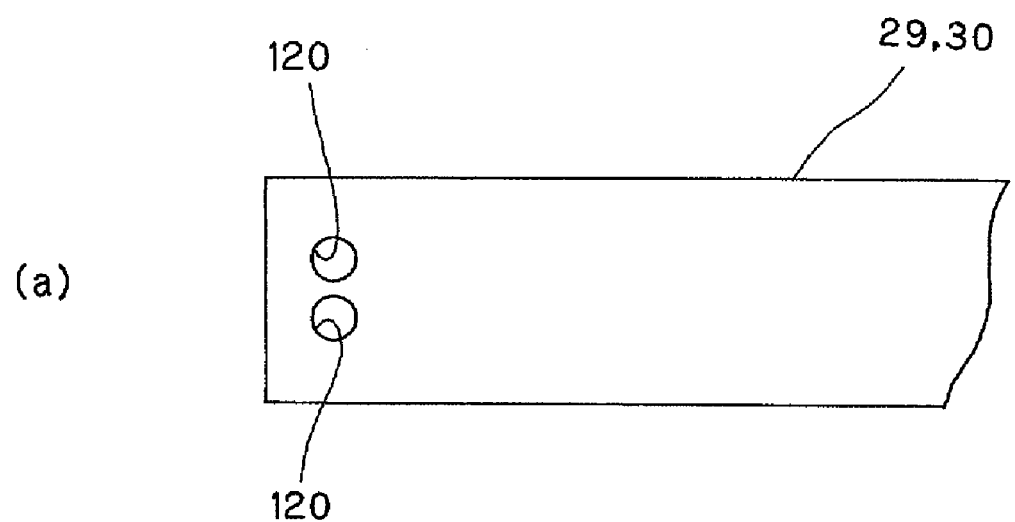
FIG. 8 shows the configuration of a dustproof belt according to related art, (a) in FIG. 8 describing the positions of attachment holes provided in the dustproof belt and (b) in FIG. 8 being a cross-sectional view showing the attached dustproof belt.
Figure 8:
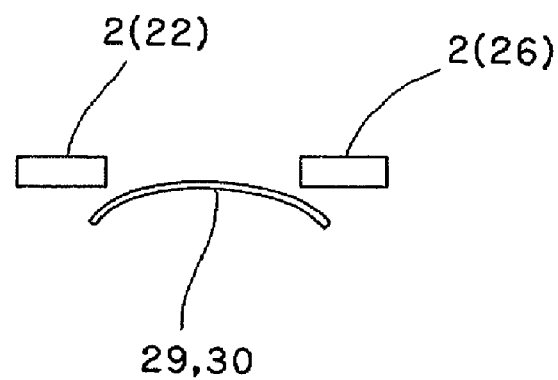
Figure 9:
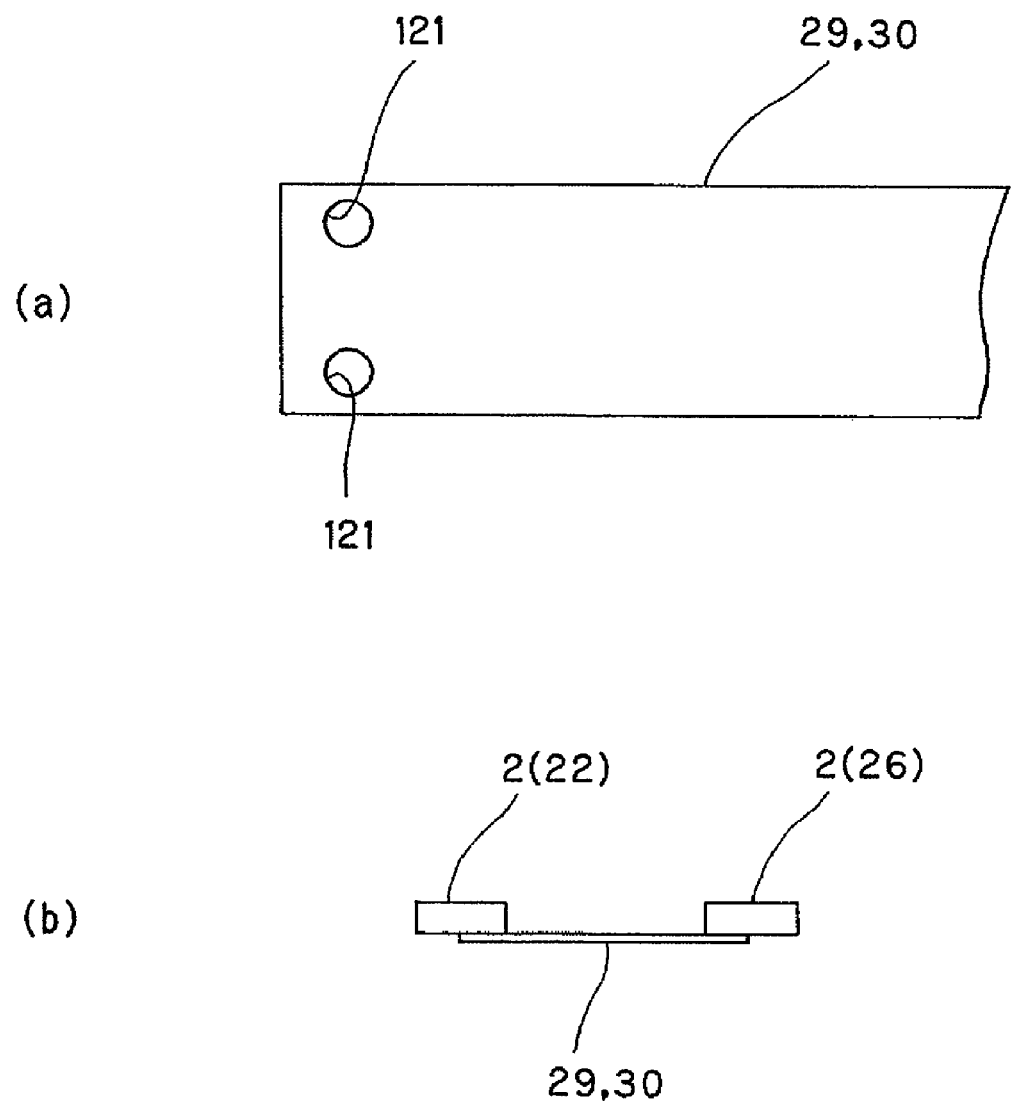
FIG. 9 shows the configuration of a dustproof belt according to an improved form of the present embodiment, (a) in FIG. 9 describing the positions of attachment holes provided in the dustproof belt and (b) in FIG. 9 being a cross-sectional view showing the attached dustproof belt.
Figure 10:
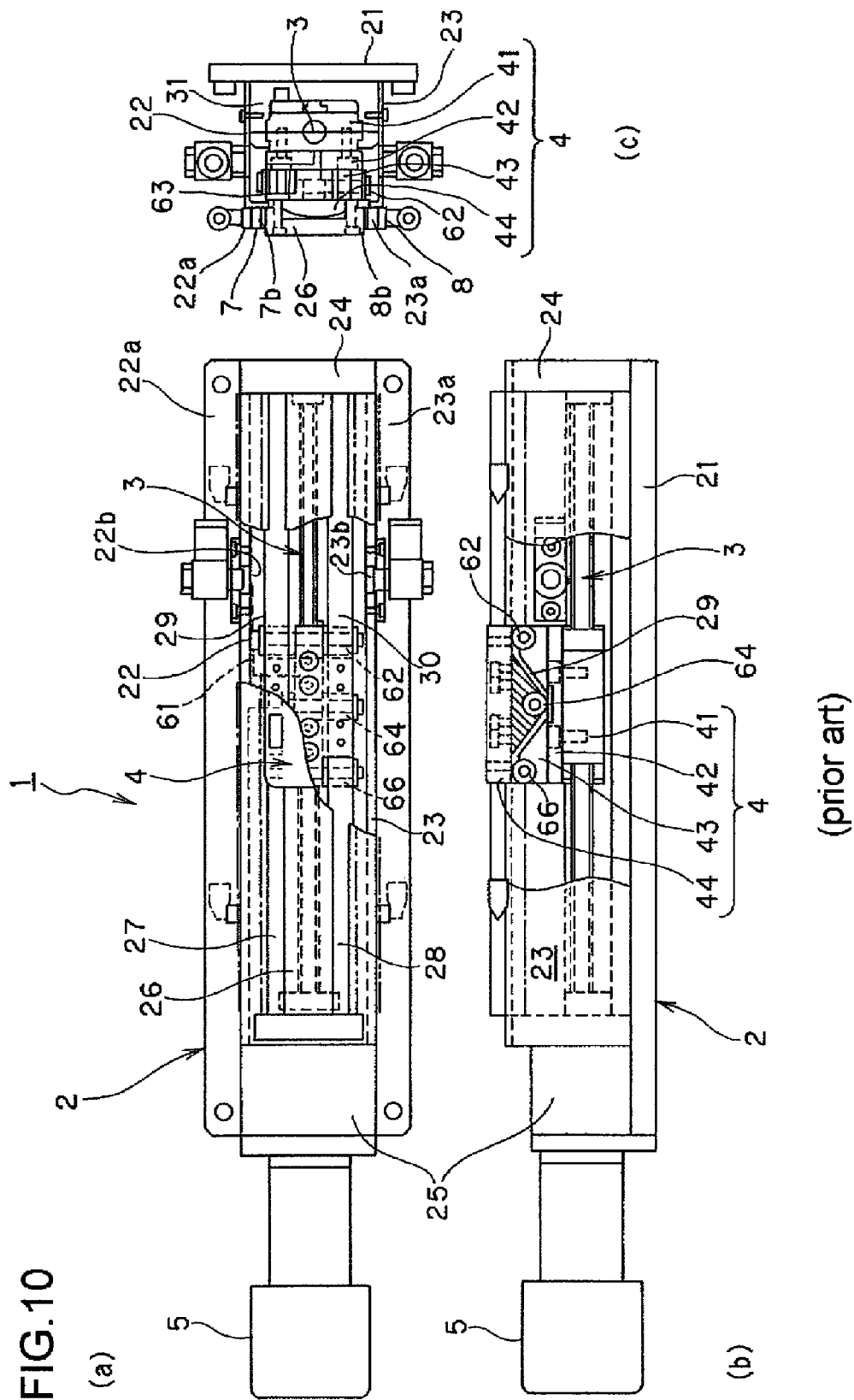
FIG. 10 describes the configuration of a linear actuator with a dustproof mechanism according to related art, (a) in FIG. 10 being a top view of the linear actuator with a dustproof mechanism, (b) in FIG. 10 being a front view of the linear actuator with a dustproof mechanism, and (c) in FIG. 10 being a transverse cross-sectional view of the linear actuator with a dustproof mechanism.

For example, each of the dustproof belts 29, 30 according to the related art has attachment holes 120 for fixing the dustproof belt to the housing member 2, as shown in (a) in FIG. 8. The attachment holes 120 are formed in positions close to the center line of each of the dustproof belts 29, 30 to make the attachment and machining easier.

When the attachment holes 120 are formed in the positions shown in (a) in FIG. 8, the dustproof belts 29, 30 disadvantageously loosen in the width direction, as shown in (b) in FIG. 8, creating a possibility of decrease in sealing performance between the housing member 2 and the dustproof belts 29, 30.

Therefore, the present inventors have decided to make improvement in which attachment holes 121 are formed in the periphery of the dustproof belts 29, 30. The configuration of the present improvement, in which the attachment holes 121 are formed in the periphery of the dustproof belts 29, 30, is a significantly preferable form, particularly because it is often the case that a pair of attachment holes 121 are formed on both ends of the dustproof belts 29, 30, four in total, and the attachment holes 121 are used to fix the dustproof belts 29, 30 with the four corners thereof pulled. Employing the configuration allows the sealing performance between the housing member 2 and the dustproof belts 29, 30 to be drastically improved as compared to the related art.

[Improvement of Rollers]

In the linear actuator 1 with a dustproof mechanism according to the relate art, the rotatable rollers 61 to 66 horizontally protruding from the movable stage 4 are employed as the device that is provided on the movable stage 4 and allows the dustproof belts 29, 30 to detour. In the related art, the rollers 61 to 66 are metallic rollers made only of a metallic material.

It has been, however, found that when the dustproof belts 29, 30 made of a resin material repeatedly slide on the rollers 61 to 66 made of a metallic material particularly at high speeds, dirt is attached to the dustproof belts 29, 30 because of the increase in tension together with the increase in speed.

The inventors have found from the fact described above that the dustproof belts 29, 30 made of a resin and the rollers 61 to 66 made of a metal are not a good match in terms of dirt attachment particularly when the linear actuator 1 with a dustproof mechanism is driven at high speeds. The inventors have conducted extensive studies and found that the dirt attachment is suppressed by forming the surface of each of the rollers 61 to 66 with a resin material so that the slide operation is carried out between the resin materials.

As described above, at least the surface of each of the rollers 61 to 66 disposed on the movable stage 4 as the detouring device is preferably made of a resin material. Specifically, the surface of each of the rollers can be made of a resin material by press-fitting a resin cover to the roller made of a metallic material or the roller itself can be made of a resin material. Employing the configuration can prevent dirt from attaching to the dustproof belts 29, 30 and the rollers 61 to 66. A linear actuator with a dustproof mechanism capable of preventing dust from being produced can thus be achieved.

It is apparent from the description of the claims that the technical scope of the present invention encompasses a variety of forms to which such changes or improvements are made.

The invention claimed is:

1. A linear actuator with a dustproof mechanism, comprising:
   a ball screw;
   a movable stage including a ball screw nut that engages the ball screw, the movable stage capable of making linear reciprocating motion in an axial direction of the ball screw in response to a rotary motion of the ball screw;
   a housing member disposed to cover at least the ball screw;
   an opening formed in the housing member along a path along which the movable stage travels; and
   a dustproof belt disposed inside the housing member to block the opening,
   the movable stage including a detouring device that allows a portion of the dustproof belt that overlaps with the movable stage to detour in order to move the movable stage along the opening with the opening remaining blocked with the dustproof belt; and
   end plate covers covering the ends of the housing member, each of the end plate covers being shaped to cover areas of the housing member where the dustproof belt is disposed, each of the end plate covers including a flange disposed in a position facing the location where the dustproof belt is disposed in the housing member.

2. The linear actuator with a dustproof mechanism according to claim 1,
   wherein each of the end plate covers includes an elastic member at the location where the end plate cover comes into contact with the housing member.

3. The linear actuator with a dustproof mechanism according to claim 2,
   wherein the dustproof belt has attachment holes for fixing the dustproof belt to the housing member, the attachment holes being formed of four attachment holes, two of said attachment holes at each end of the dustproof belt, and formed in a periphery of the dustproof belt.

4. The linear actuator with a dustproof mechanism according to claim 2,
   wherein the detouring device provided on the movable stage includes a plurality of rotatable rollers that engage the dustproof belt, and
   at least the surface of each of the plurality of rollers is made of a resin material.

5. The linear actuator with a dustproof mechanism according to claim 1,
   wherein the dustproof belt has attachment holes for fixing the dustproof belt to the housing member, the attachment holes being formed of four attachment holes, two of said attachment holes at each end of the dustproof belt, and formed in a periphery of the dustproof belt.

6. The linear actuator with a dustproof mechanism according to claim 1,
   wherein the detouring device provided on the movable stage includes a plurality of rotatable rollers that engage the dustproof belt, and
   at least the surface of each of the plurality of rollers is made of a resin material.

7. A linear actuator with a dustproof mechanism, comprising:
   a ball screw;
   a movable stage including a ball screw nut that engages the ball screw, the movable stage capable of making linear reciprocating motion in the axial direction of the ball screw in response to rotary motion of the ball screw;
   a housing member disposed to cover at least the ball screw;
   an opening formed in the housing member along the path along which the movable stage travels; and
   a dustproof belt disposed inside the housing member to block the opening,
   the movable stage including a detouring device that allows the portion of the dustproof belt that overlaps with the movable stage to detour in order to move the movable stage along the opening with the opening remaining blocked with the dustproof belt; and
   a dust collection device for confining dust in the housing member located at an end of the housing member, the dust collection device including a dust collection compartment having an airtight connection to an end of the housing member, a communication hole that allows the interior of the dust collection compartment to communicate with the interior of the housing member, and a sucking port through which dust in the dust collection compartment is discharged.

8. The linear actuator with a dustproof mechanism according to claim 7,
wherein an exhaust device is formed at the communication hole.

9. The linear actuator with a dustproof mechanism according to claim 8,
wherein the exhaust device is a fan.

10. The linear actuator with a dustproof mechanism according to claim 8,
wherein the dustproof belt has attachment holes for fixing the dustproof belt to the housing member, the attachment holes being formed of four attachment holes, two of said attachment holes at each end of the dustproof belt, and formed in a periphery of the dustproof belt.

11. The linear actuator with a dustproof mechanism according to claim 9,
wherein the dustproof belt has attachment holes for fixing the dustproof belt to the housing member, the attachment holes being formed of four attachment holes, two of said attachment holes at each end of the dustproof belt, and formed in a periphery of the dustproof belt.

12. The linear actuator with a dustproof mechanism according to claim 7,
wherein the dustproof belt has attachment holes for fixing the dustproof belt to the housing member, the attachment holes being formed of four attachment holes, two of said attachment holes at each end of the dustproof belt, and formed in a periphery of the dustproof belt.

13. The linear actuator with a dustproof mechanism according to claim 11,
wherein the dustproof belt has attachment holes for fixing the dustproof belt to the housing member, the attachment holes being formed of four attachment holes, two of said attachment holes at each end of the dustproof belt, and formed in a periphery of the dustproof belt.

* * * * *